United States Patent Office 3,426,087
Patented Feb. 4, 1969

3,426,087
METHOD FOR THE PREPARATION OF GRIGNARD COMPOUNDS IN HYDROCARBON SOLUTION
Eugene C. Ashby, Atlanta, Ga., assignor to M & T Chemicals Inc., New York, N.Y., a corporation of Delaware
No Drawing. Filed July 29, 1965, Ser. No. 475,883
U.S. Cl. 260—665  3 Claims
Int. Cl. C07f 3/02

ABSTRACT OF THE DISCLOSURE

A process for preparing a hydrocarbon solution containing a Grignard compound of the general formula RMgX, wherein R is a hydrocarbon radical selected from the group consisting of alkyl, aryl, and alkenyl, and X is a halogen atom, which comprises reacting in hydrocarbon, in an amount sufficient to dissolve said Grignard compound, magnesium, RX, wherein R and X are as defined above, and a tertiary alkyl amine, thereby forming a hydrocarbon solution containing said Grignard compound RMgX.

---

This invention relates to the preparation of Grignard compounds in hydrocarbon solvent and the use of the resulting solutions in alkylations reactions.

The importance of Grignard reagents in synthetic organic chemistry is well known. Since the discovery of this reagent by Grignard in 1900, diethyl ether has been used almost exclusively as the solvent for the preparation of these compounds. More recently another ether, tetrahydrofuran, has been employed to advantage for the preparation of certain Grignard compounds (e.g. vinylmagnesium bromide and phenylmagnesium chloride) not readily prepared in diethyl ether [1]. Aliphatic [2] and aromatic [3] hydrocarbons have been used as diluents in the reaction of alkyl halides with magnesium, however, a mixture of insoluble products are produced, the composition of which appears to vary depending on the conditions of the reaction. Compounds of the composition $R_3Mg_2X$ and $MgX_2$ have been isolated from the solid reaction products. The use of dimethylaniline as a catalyst for the reaction of an alkyl halide and magnesium in hydrocarbon diluent also has been reported,[4] however, once again the resulting magnesium product is insoluble.

The subject of this invention is the preparation of typical Grignard compounds in hydrocarbon solvents such as benzene, toluene and hexane resulting in the production of true solutions which exhibit the normal alkylation reactions of Grignard compounds in ether solvent. The preparation of the Grignard compounds involves the reaction of an alkyl or aryl halide and magnesium turnings in benzene solvent in the presence of an equimolar amount of a tertiary amine. The preparation of true solutions by this method is somewhat unusual in that the same reaction using diethyl ether as the complexing agent results in the precipitation of solids of non-stoichiometric composition. The use of a tertiary amine as the complexing agent appears to be successful due to the non-disproportion tendency of the RMgX species when complexed to a tertiary amine.[5] This new method eliminates the use of the more expensive and hazardous diethyl ether and makes available Grignard compounds in hydrocarbon solution which function as well in alkylation reactions as the Grignard compounds in ether solution. Typical aliphatic and aromatic magnesium chlorides, bromides and iodides are produced in yields of 70 to 93% by this method.

The reaction is normally started at room temperature to 50° C. and the reaction temperature maintained at approximately 50° C. during reaction. There appears to be no ill effects when the reaction temperature is allowed to exceed 50° C., however, 50° C. was chosen as a reasonable temperature at which only minor amounts of by-products were produced.

Triethylamine appears to be a good choice as the complexing agent although other tertiary amines such as, tri-n-propylamine or tri-n-butylamine work as well. Trimethylamine has the disadvantage of low boiling point which makes the reaction difficult to start, however, this problem is overcome by working in a closed system. Dimethylaniline has the disadvantage that not all Grignard compounds complexed with this amine are soluble in benzene to the extent that Grignard compounds complexed with triethylamine are soluble. Even so some Grignard compounds were prepared in 0.3 M solution in benzene when complexed with dimethylaniline. Our results using triethylamine in large excess as the solvent for the Grignard preparation indicates that quaternary salt formation ($R'X + R_3N \rightarrow R_3R'NX$) and dehydrohalogenation ($R'X + R_3N \rightarrow$ olefin $+ R_3NHX$) can be a problem. However, in hydrocarbon solvent, under the conditions employed, these side reactions were not detected.

Although most of the Grignard compounds were prepared to produce a 1 M solution in benzene, ethylmagnesium bromide and n-butylmagnesium chloride have been prepared in concentrations approaching 2 M and 3 M respectively. In most cases toluene appears to be equivalent to benzene and in some cases hexane is a satisfactory solvent.

The alkyl, and alkenyl and aryl halides used in this process are the typical alkyl, and alkenyl and aryl halides employed in the conventional Grignard preparations in diethyl ether or tetrahydrofuran solvent e.g., ethyl chloride, methyl bromide, vinyl chloride, bromobenzene, etc. All of the halides used (chlorides, bromides and iodides) appear to function in the process equally as well.

The ratio of Grignard compound to tertiary amine can vary from 1.0:0.1 to 1.0:2.0. However, the solubility of the Grignard compound in hydrocarbon solvent appears to decrease as the ratio of Grignard compound to tertiary amine increases from 1.0:1.0 to 1.0:0.1.

The magnesium metal used in this process is the commercially available "Grignard grade" magnesium turnings. Triply sublimed magnesium granules also function satisfactorily but such high purity is not required. The ratio of magnesium to alkyl halide is normally 1:1 although it is advantageous to use about a 20% excess of magnesium in order to have activated magnesium for recycle in next preparation.

The following examples are provided in order to demonstrate the process in more detail.

EXAMPLE I

Ethyl bromide (0.5 mole) was dissolved in 400 ml. of dry benzene and added to magnesium turnings (0.5) mole diluted with 30 ml. benzene and 0.5 mole of triethylamine. Approximately 30 ml. of the ethyl bromide-benzene solution was added and the reaction started by gentle warming. The remainder of the ethyl bromide-benzene solution was added rapidly over a twenty minute period while cooling the reaction mixture in order to keep the reaction temperature at about 50° C. The resulting solution was clear and colorless and exhibited a Mg:Br ratio of 1.07:1.00 by EDTA analysis. The triethylamine was found to be complexed to the $C_2H_5MgBr$. By removing the benzene solvent under vacuum the solid product showed a Mg:Br:N

---

[1] H. E. Ramsden, U.S. 2,838,508 (1958).
[2] L. I. Zakharkin, O. Yu. Okhlobystein and B. N. Strunin, Tetrahedron Letters, No. 14, 631 (1962).
[3] D. Bryce-Smith and G. F. Cox, J. Chem. Soc., 1175 (1961).
[4] R. Barre and J. DeRepentigny, Canad. J. Res., Sec. B27, 716 (1949).
[5] E. C. Ashby, J. Am. Chem. Soc., 87, 2509 (1965).

ratio of 1.07:1.00:1.10. Ethylmagnesium bromide was produced in 88% yield. The benzene solution of ethyl magnesium bromide was used to alkylate benzaldehyde and acetophenone. Ethyl phenylcarbinol and ethylmethylphenylcarbinol were produced in 92 and 88% yield respectively.

EXAMPLE II n-Butyl chloride (0.5 mole) was dissolved in 300 ml. of dry toluene and added to magnesium turnings (0.6 mole) diluted with 30 ml. toluene and 0.5 mole triethylamine. The reaction proceeded readily at 50° C. The resulting solution had a Mg:Cl ratio of 1.01:1.00. When the solvent was removed under vacuum the resulting solid analyzed 11.0% Mg; 16.0% chlorine and 5.9% nitrogen representing a Mg:Cl:N ratio of 1.09:1.08:1.00. n-Butyl magnesium chloride was produced in 93% yield.

EXAMPLE III

Ethyl bromide (0.05 mole) in 400 ml. hexane was added to magnesium turnings (0.06 mole) diluted with 0.05 mole of dimethylaniline. The reaction mixture was heated to 50° C. for two hours and then filtered from the excess magnesium. Analysis of the resulting solution showed a Mg:Br ratio of 1.03 to 1.00. Analysis of the solid produced by vacuum distillation of the solvent showed a Mg:Br:N ratio of 1.04:1.03:1.00.

The ethylmagnesium bromide produced in this reaction in hexane solvent was reacted with silicon tetrachloride and tin tetrachloride separately. Tetraethylsilane and tetraethylstannane were produced in 81% and 84% yield respectively.

I claim:

1. A process for preparing a hydrocarbon solution containing a Grignard compound of the general formula RMgX, wherein R is a hydrocarbon radical selected from the group consisting of alkyl, aryl, and alkenyl, and X is a halogen atom, which comprises reacting in hydrocarbon, in an amount sufficient to dissolve said Grignard compound, substantially equimolar quantities of magnesium, RX, wherein R and X are as defined above, and a tertiary alkyl amine, thereby forming a hydrocarbon solution containing said Grignard compound RMgX.

2. The method of claim 1 wherein the tertiary alkyl amine is triethylamine.

3. The method of claim 1 wherein the tertiary alkyl amine is trimethylamine.

References Cited

Scherr: Chemical Abstracts, vol. 43 (1949), pp. 2928 to 2929.

Kharasch et al.: Grignard Reactions of Nonmetallic Substances, 1954, pp. 50, 52, 53, 1306 and 1307.

HELEN M. McCARTHY, *Primary Examiner.*

W. F. W. BELLAMY, *Assistant Examiner.*

U.S. Cl. X.R.

260—448.2, 429.7